Figure 1:
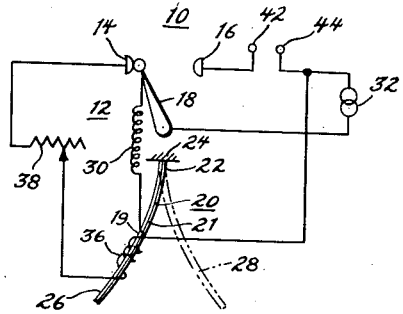

Sept. 18, 1962     A. BLAIN     3,054,875

CONTROL DEVICE

Filed Dec. 24, 1957

INVENTOR.
ALBERT BLAIN
BY
Trachtman + Zoda
ATTORNEYS.

United States Patent Office 3,054,875
Patented Sept. 18, 1962

3,054,875
CONTROL DEVICE
Albert Blain, Philadelphia, Pa., assignor to General Atronics Corporation, Bala-Cynwyd, Pa., a corporation of Pennsylvania
Filed Dec. 24, 1957, Ser. No. 704,933
8 Claims. (Cl. 200—122)

This invention relates to a control device, and more particularly to a temperature sensitive control device.

Although temperature sensitive control devices have been provided in the past, such devices have not achieved the advantages or the objectives of the control device disclosed herein.

The principal object of the invention is to provide a new and improved control device which is highly sensitive and reliable in operation.

Another object of the invention is to provide a new and improved control device which is sensitive to variations in temperature.

Another object of the invention is to provide a new and improved control device in the form of a temperature sensitive relay for controlling the temperature of a device.

Another object of the invention is to provide a new and improved device for controlling the temperature of a heat source.

Another object of the invention is to provide a new and improved control device which is highly adaptable for utilization under various design requirements.

The above objectives as well as many others are achieved by providing a control device comprising a switch unit having first and second contacts and the contact arm. The contact arm has first and second positions respectively engaging the first and second contacts of the switch. A first bimetallic element is provided and has an extremity which is movable between first and second positions responsive to variations in temperature. A connecting means links the extremity of the first element and the contact arm of the switch unit for controlling the position of the contact arm. A second bimetallic element is similarly provided with an extremity movable between first and second positions responsive to variations in temperature and when in its second position prevents the motion of the extremity of the first element from its second position to its first position.

A load and power source are series connected between the arm and the second contact of the switch unit for delivering power to the load when the arm engages the second contact of the switch unit. The power source and a heating means are also series connected between the arm and first contact of the switch unit for heating the first bimetallic element when the arm engages the first contact of the switch unit. A second heating means is provided for heating the second bimetallic element in inverse relationship to the temperature of the load for causing the second element to assume its first position when the temperature of the load is above a predetermined value.

The extremities of the first and second bimetallic elements may also be provided with contacts for completing an energizing circuit when engaged, through the first heating means associated with the first bimetallic element. The contacts of the first and second bimetallic elements become engaged when the second element remains in its second position and the first element moves a predetermined distance from its second position towards its first position. Upon engagement of the contacts of the first and second elements and energization of the heating unit associated with the first element, the first element is caused to reverse the direction of its motion and move toward its second position. Thus, until the temperature of the load is sufficiently increased, the extremity of the first bimetallic element is prevented from assuming its first terminal position for terminating the delivery of power to the load means.

Figure 2:
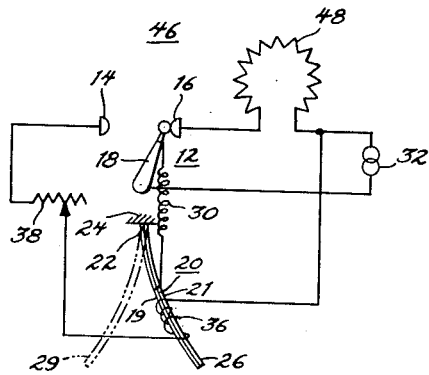
Figure 3:
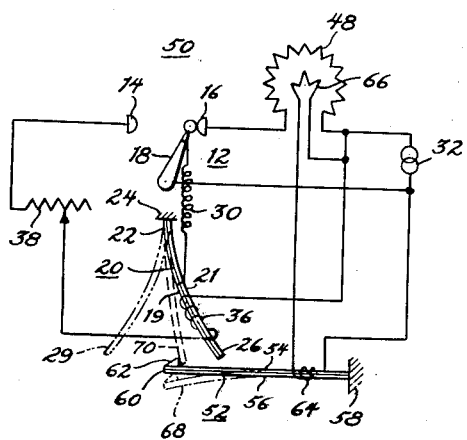
Figure 4:
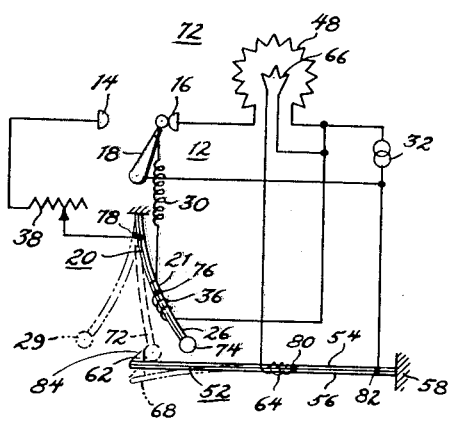

The above objects of the invention as well as many other objects of the invention will become apparent when the following description is read in conjunction with the drawings, in which:

FIGURE 1 is a schematic drawing illustrating a control device embodying the invention, FIGURE 2 is a schematic drawing illustrating a modified form of the control device shown in FIGURE 1, FIGURE 3 is a schematic drawing illustrating a third form of the control device disclosed in FIGURE 1, and FIGURE 4 is a schematic drawing illustrating a modified form of the control device disclosed in FIGURE 3.

Like reference numerals designate like parts throughout the several views.

The FIGURE 1 is a schematic drawing illustrating the control device 10 embodying the invention.

The control device 10 includes a switch unit 12 having first and second contacts 14 and 16 and a contact arm 18. The arm 18 has a first position engaging the contact 14 and a second position engaging the contact 16 of the switch 12.

A bimetallic element 20 has an extremity 22 fixed with a support 24 and an extremity 26 movable between first and second positions responsive to temperature. The temperature responsive movement of the free extremity 26 of the bimetallic element 20 is accomplished by utilizing an element 20 having two strips 19, 21 respectively of material with different coefficients of expansion, as is well known in the art.

When the bimetallic element 20 is at a predetermined reduced temperature, it assumes the first position shown in FIGURE 1 by solid lines, while when its temperature is raised to a predetermined value it assumes its second position shown by the dash lines at 28.

The movable portion of the bimetallic element 20 is connected by a coiled spring means 30 with the movable extremity of the contact arm 18. Thus, when the bimetallic element 20 moves from its first position (indicated in FIGURE 1 by solid lines) to its second position shown at 28, the spring means 30 by toggle action causes the contact arm 18 to assume its second position engaging contact 16. Similarly when the element 20 returns to its first position, the spring means 30 causes the contact arm 18 to assume its first position in engagement with the contact 14. It is noted that switching action takes place during a short period of time in which the arm 18 is snapped from one contact 14, 16 to the other by action of the coil spring 30 under control of the bimetallic element 20.

The control device 10 is adapted to receive energization from a power source 32. A terminal 42 is connected to the contact 16 while a terminal 44 joins the power source 32. The terminal 44 is also connected to the contact 14 by a series connected heating coil 36 and a variable resistor 38. The heating coil 36 is associated with the bimetallic element 20 for raising its temperature when energized, while the variable resistor 38 controls the current flow through the coil 36 and thereby the heat generated by the heating coil 36.

In operation with the contact arm 18 in its first position as shown in FIGURE 1, current is caused to flow through the heating coil 36 about the bimetallic element 20. This is due to the fact that the circuit is completed from the power source 32 through coil 36, through resistor 38, contact 14 and contact arm 18 engaging contact 14. The heat supplied by the coil 36 raises the temperature of the bimetallic element 20 and causes it to move towards its second position. When the bimetallic element 20 has assumed its second position shown by the dash lines at 28 in FIGURE 1, the contact arm 18 is caused to disengage the contact 14 and assume its second position in the engagement with the contact 16.

By assuming its second position, the contact arm 18 opens the circuit through the heating coil 36, thereby preventing further application of heat to the bimetallic element 20.

The contact arm 18, however, by engaging the contact 16 completes a circuit through the switch 12 and the power source 32 to the terminals 42, 44 delivering a signal thereto.

As the temperature of the bimetallic element 20 decreases it moves towards its first position and causes the switch 12 to assume its first position after a predetermined period of time. As previously explained, at this time, the circuit through the heating coil 36 is again completed and heat is applied to the bimetallic element 20 raising its temperature and causing it to assume its second position at 28 after a predetermined period of time. This cycle is continuously repeated alternating the switch 12 between its first and second positions and correspondingly delivering an output signal to the signal output terminals 42, 44 during the intervals when the switch 12 is in its second position. Of course, the device 10 may be modified to deliver an output signal when the switch 12 is in its first position engaging the contact 14.

It is also noted that the control device 10 can provide a timing means for controlling and positioning the switch 12. The interval of time required to switch the contact arm 18 of switch 12 from its first to second positions may be controlled by the variable resistor 38. Thus, as the resistance of resistor 38 is decreased the temperature of the bimetallic element 20 will be raised at a greater rate decreasing the time required for actuating the switch 12 from its first to its second positions. Similarly, if the resistance of the resistor 38 is increased, the period of time required to actuate the switch 12 from its first to its second positions will be increased.

The FIGURE 2 illustrates a control device 46 which is identical to that of device 10 except that a load 48 which may be in the form of a heat generator is connected across the terminals 42, 44 of the device 10. The bimetallic element 20 is shown by solid lines in its second position, while the dashed lines at 29 show bimetallic element in its first position.

In operation, the control device 46 acts to control the intervals of time during which energization is applied to the load 48. Thus, when the switch 12 is in its second position with the arm 18 engaging contact 16, the circuit is completed through the load 48 applying energization to it from the power source 32. When the switch 12 is in its second position energization is not supplied through the heating coil 36, so that the bimetallic element 20 cools and after a predetermined interval of time assumes its first terminal position at 29. At this time, switch 12 is caused to assume its first position engaging terminal 14 and terminating the supply of current to the load 48 while providing energization to the heating coil 36. After the bimetallic element 20 has its temperature sufficiently raised to cause it to assume its second position, the switch 12 is returned to its second position and energization is transferred from the heating coil 36 to the load 48. This cycle continues indefinitely and energization is delivered to the load 48 only during alternate predetermined intervals, which intervals, as previously explained may be controlled by varying the resistance of the resistor 38.

The FIGURE 3 is a schematic drawing illustrating a control device 50 which is similar to that of device 46.

The device 50 includes a second bimetallic element 52 comprising a pair of strips 54, 56 of respective materials having different temperature coefficients of expansion. One end of the bimetallic element 52 is secured with a fixed support 58, while the other end 60 is free to move between first and second positions responsive to temperature.

The end 60 of the bimetallic element 52 is also provided with a hook retaining portion 62.

A heating coil 64 is connected across the power source 32 in series with a thermistor 66. The heating coil 64 is received about the bimetallic element 52 for increasing its temperature when energized, while the thermistor 66 is located approximate the load 48 for sensing its temperature. Since the resistance of the thermistor 66 varies directly with its temperature, the current permitted to flow through the heating coil 64 varies inversely with the temperature sensed by the thermistor 66.

It is noted that when the bimetallic element 52 is not heated by the heating coil 64, it assumes its first position shown in FIGURE 3 by the dashed lines at 68. However, when sufficient current is supplied to the heating coil 64 to raise the temperature of the bimetallic element 52 to a predetermined value, the element 52 assumes its second position shown by the solid lines.

The operation of the device 50 is as follows. When the switch 12 is first actuated to its second position as shown in FIGURE 3, the bimetallic element 20 is in its second position with its heating coil 36 de-energized. The temperature of the load 48 or heat generator is at its low point, so that the resistance of the thermistor 66 is correspondingly low and the current to the energizing coil 64 has its maximum value. The temperature of the bimetallic element 52 is therefore sufficiently increased to cause it to assume its second position shown in FIGURE 3 by the solid lines.

As the temperature of the heat generator of load 48 increases, the resistance of the thermistor likewise increases and reduces the current delivered to the coil 64. This results in a reduction of the temperature of the bimetallic element 52 causing it to move towards its first position at 68. Since energization of the heating coil 36 about bimetallic element 20 has been terminated, the bimetallic element 20 cools and is thereby caused to move towards its first position at 29. The bimetallic element 20, however, is prevented from assuming its first position unless the load 48 has achieved at predetermined temperature.

This action is accomplished by the bimetallic element 52. Since the temperature of the bimetallic element 52 is controlled by the heating element 64 responsive to the thermistor 66, the hook portion 62 of the element 52 will engage and prevent the motion of the bimetallic element 20 past its position shown in dashed lines at 70, unless the element 52 has been sufficiently deflected from its second position towards its first position at 68. By preventing the bimetallic element 20 from assuming its first position, energization is continuously supplied to the load 48 until it has attained the desired temperature condition. At such a time, the bimetallic element 20 is allowed to proceed towards its first position. This actuates the switch 12 to move to its first position terminating the energization of the load 48 and supplying current to the heating coil 36 of the element 20. As already noted, the interval of time during which energization is not supplied to load 48 may be controlled by adjusting the resistance of the variable resistor 38.

The advantages of the modified form of the control device 50 inhere in providing means assuring that the temperature of the load 48 attains a predetermined value before its energization is terminated.

The FIGURE 4 discloses a control device 72 which is a modified form of the control device 50 shown in FIGURE 3.

The movable end 26 of the bimetallic element 20 is provided in an electrical contact 74, while the protruding hook portion 62 of the bimetallic element 52 also provides an electrical contact for engaging the contact 74. The coil spring means 30 is suitably insulated so that it does not provide an electrical circuit between the switching arm 18 of switch 12 and the bimetallic element 20.

One end of the heating coil 36 associated with the bimetallic element 20 is electrically joined with the bimetallic element 20 at 76, while one end of the variable resistor 38 is similarly electrically connected at 78. The bimetallic element 20, being made of conductive metallic materials, provides an electrical path between the points 76 and 78 and its contact 74.

One end of the heating coil 64 associated with the bimetallic element 52 is also electrically connected at 80 with the bimetallic element 52. The power source 32 has one side connected at 82 with the bimetallic element 52 for completing the energization circuit through the heating coil 64. Since the element 52 is also made of an electrically conductive material the points 80 and 82 are electrically joined with the contact portion 62 of the element 52.

In operation, the device 72 functions in a manner substantially similar to that already described in connection with the control device 50 except for the following differences.

When the bimetallic element 20 is prevented from proceeding towards its first position at 29, its contact 74 engages the contact 62 of the element 52. This completes an electrical circuit from the power source 32 to the heating coil 36 as long as the contacts 62, 74 remain engaged. The heat supplied by the coil 36 increases the temperature of the element 20 causing it to reverse its direction and move towards its second position. This causes it to lose engagement with the contact 62 of the element 52 and terminate further energization of its heating coil 36. The bimetallic element 20, therefore, begins to lose heat and its temperature is reduced resulting in its movement towards its first position. If the temperature of the load heat generating means 48 has not attained a predetermined value, the contact 74 of the element 20 will again engage the contact 62 of element 52 and the preceding cycle will be repeated. Such action continues until the load 48 has attained the desired temperature.

At this time, the bimetallic element 52 will be deflected towards its first terminal position at 68 and removed from the path of the bimetallic element 20 in its movement towards its first terminal position. The bimetallic element 20 will then assume its first position and actuate the switch 12 to its first position thereby terminating the energization of the load 48.

The bimetallic element 20 will then proceed towards its second position by action of its heating coil 36 for the continued operation of the control device 72 as previously described.

It is noted that the protruding contact 62 of the bimetallic element 52 is provided with an inclined surface 84 allowing the bimetallic element 20 to proceed towards its second position even though the bimetallic element 52 is in its second position as shown by the solid lines of FIGURE 4. Under such circumstances the action of the movable end of the bimetallic element 20 on the inclined surface 84 of projecting portion 62 of the element 52 would cause a mechanical deflection of the element 52 allowing element 20 to continue its motion and pass thereover.

The advantages of the reciprocating or hunting action caused by energizing the heating coil 36 by engagement of the contacts 62 and 74 is evident from the fact that this prevents the build up of a high contact force which would result if the bimetallic element 20 is retained in its position shown by the dash lines of 72 while it continues to cool. The elimination of such a force will result in increased operating efficiency and reliability of the device 72.

Although the control means has been particularly described in connection with the control of energization of a load of the heat generating type, it will be obvious that the invention is not limited in this respect and may have other and varied appropriate applications.

While this invention has been described and illustrated with reference to several specific embodiments, it is to be understood that the invention is capable of various modifications and applications, not departing essentially from the spirit thereof, which will become apparent to those skilled in the art.

What is claimed is:

1. A control device comprising a switch unit having first and second contacts and a rigid pivotal contact arm having first and second positions respectively engaging said first and second contacts, a load connected for energization when said switch is in its second position, a first bimetallic element having an extremity movable between first and second positions responsive to variations in temperature, coiled spring means connecting the extremity of said first element and the contact arm of said unit for controlling the position of said contact arm, and a second bimetallic element having an extremity movable between first and second positions responsive to variations in temperature of said load, said movable extremity of said second element when in its second position being disposed in the path of and preventing the motion of the extremity of said first element from its second position to its first position.

2. The control device of claim 1 including a power source series connected with said load between the arm and the second contact of said switch unit for applying power to said load when said arm engages the second contact of said switch unit, and heating means being series connected with said power source between the arm and first contact of said switch unit for heating the first bimetallic element when the arm engages the first contact of said switch unit.

3. The control device of claim 2 in which said load generates heat and including a second heating means heating said second bimetallic element inversely responsive to the temperature of said load for causing said second element to assume its first position when the temperature of said load is below a predetermined value.

4. A control device comprising a switch unit having first and second contacts and a contact arm having first and second positions respectively engaging said first and second contacts, a first bimetallic element having an extremity movable between first and second positions responsive to variations in temperature, means connecting the extremity of said first element and the contact arm of said unit for controlling the position of said contact arm, a second bimetallic element having an extremity movable between first and second positions responsive to variations in temperature and when in its second position preventing the motion of the extremity of said first element from its second position to its first position, a heat generating load and a power source series connected between the arm and the second contact of said switch unit for applying power to said load when said arm engages the second contact of said switch unit, a first heating means for said first bimetallic element, said power source and said heating means being series connected between the arm and first contact of said switch unit for heating the first bimetallic element when the arm engages the first contact of said switch unit, and a second heating means heating said second bimetallic element inversely responsive to the temperature of said load for causing said second element to assume its second position when the temperature of said load is below a predetermined value.

5. A control device comprising, in combination, a switch unit having first and second fixed electrical contacts and a rigid pivotal contact arm having first and second positions respectively engaging said first and second contacts, a bimetallic element having an extremity movable between first and second positions responsive to variations in temperature, and linearly extending coiled spring means connecting the extremity of said element and the contact arm of said unit controlling the position of said contact arm responsive to temperature, said spring means permanently connecting the extremity of said element and the contact arm of said unit for actuating said arm to its first position when said element is in its first position and actuating said arm to its second position when said element is in its second position, heating means associated with said element being energized for heating said element only when the arm of said unit is in said first position, the extremity of said element being movable in a direction from its first position to its second position upon the application of heat raising its temperature and moving in the opposite direction with a decrease in its temperature, load and power source connected in series between the arm and the second contact of said switch unit for applying power to said load when said arm engages the second contact of said switch unit, said power source and said heating means being series connected between the arm and first contact of said switch unit for heating the bimetallic element only when the arm engages the first contact of said switch unit, and a variable impedance element selectively controlling the flow of heating current through said heating element.

6. A control device comprising a switch unit having first and second contacts and a contact arm having first and second positions respectively engaging said first and second contacts, a first bimetallic element having an extremity movable between first and second positions responsive to variations in temperature, means connecting the extremity of said first element and the contact arm of said unit for controlling the position of said contact arm, and a second bimetallic element having an extremity movable between first and second positions responsive to variations in temperature and when in its second position preventing the motion of the extremity of said first element from its second position to its first position, a power source series connected between the arm and the second contact of said switch unit for applying power to said load when said arm engages the second contact of said switch unit, said power source and said heating means being series connected between the arm and first contact of said switch unit for heating the first bimetallic element when the arm engages the first contact of said switch unit, said load generating heat and including a second heating means heating said second bimetallic element inversely responsive to the temperature of said load for causing said second element to assume its first position when the temperature of said load is below a predetermined value, contacts on said first and second bimetallic elements, an energizing circuit, said energizing circuit being completed through the first heating means associated with said first bimetallic element when the contacts of said first and second bimetallic elements are engaged, said contacts becoming engaged when said second element remains in its second position and said first element moves a predetermined distance from its second position toward its first position, said first element moving toward its second position upon energization of said first heating means.

7. A control device comprising a first bimetallic element movable between first and second positions responsive to variations in temperature, a second bimetallic element movable between first and second positions responsive to variations in temperature and when in its second position preventing the motion of said first element from its second position to its first position, a heat generating load and a power source series connected for applying power to said load when said first bimetallic element is in said second position, a first heating means for said first bimetallic element, said power source and said first heating means being series connected for heating said first bimetallic element when said element is in said first position, and a second heating means heating said second bimetallic element inversely responsive to the temperature of said load for causing said second element to assume its second position when the temperature of said load is below a predetermined value.

8. A control device comprising a first bimetallic element movable between first and second positions responsive to variations in temperature, a second bimetallic element movable between first and second positions responsive to variations in temperature and when in its second position preventing the motion of said first element from its second position to its first position, means responsive to the application of power to generate heat, means for applying power to said heat generating means when said first bimetallic element is in said second position, means for heating said first bimetallic element when said element is in said first position, and means for heating said second bimetallic element in inverse relation to the heat generated by said heat generating means.

References Cited in the file of this patent

UNITED STATES PATENTS

| | | |
|---|---|---|
| 915,974 | Leonard | Mar. 23, 1909 |
| 1,010,414 | Cubitt | Dec. 5, 1911 |
| 1,372,331 | Balzer et al. | Mar. 22, 1921 |
| 1,839,935 | Thomas | Jan. 5, 1932 |
| 1,856,045 | Wight | Apr. 26, 1932 |
| 1,920,806 | Rich | Aug. 1, 1933 |
| 1,948,938 | Lawton | Feb. 27, 1934 |
| 2,058,829 | Rothe | Oct. 27, 1936 |
| 2,069,625 | Rich | Feb. 2, 1937 |
| 2,070,305 | Jennings | Feb. 9, 1937 |
| 2,080,244 | Weirich | May 11, 1937 |
| 2,170,748 | Eaton | Aug. 22, 1939 |
| 2,210,947 | Myers et al. | Aug. 13, 1940 |
| 2,235,337 | Shaw | Mar. 18, 1941 |
| 2,446,474 | Harold | Aug. 3, 1948 |
| 2,508,040 | Ransome | May 16, 1950 |
| 2,612,543 | Alexander | Sept. 30, 1952 |
| 2,663,773 | Drobney et al. | Dec. 22, 1953 |
| 2,792,533 | Richards | May 14, 1957 |
| 2,859,305 | Happe | Nov. 4, 1958 |

FOREIGN PATENTS

| | | |
|---|---|---|
| 804,623 | France | Aug. 3, 1936 |
| 973,920 | France | Sept. 20, 1950 |

OTHER REFERENCES

Eureka (Publication), 2 pages, page 1 relied upon, Aug. 12, 1953.